United States Patent Office

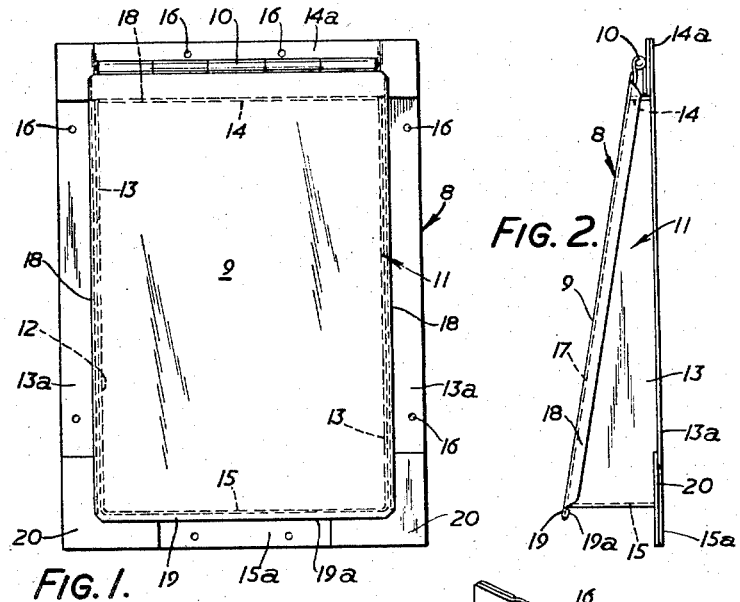
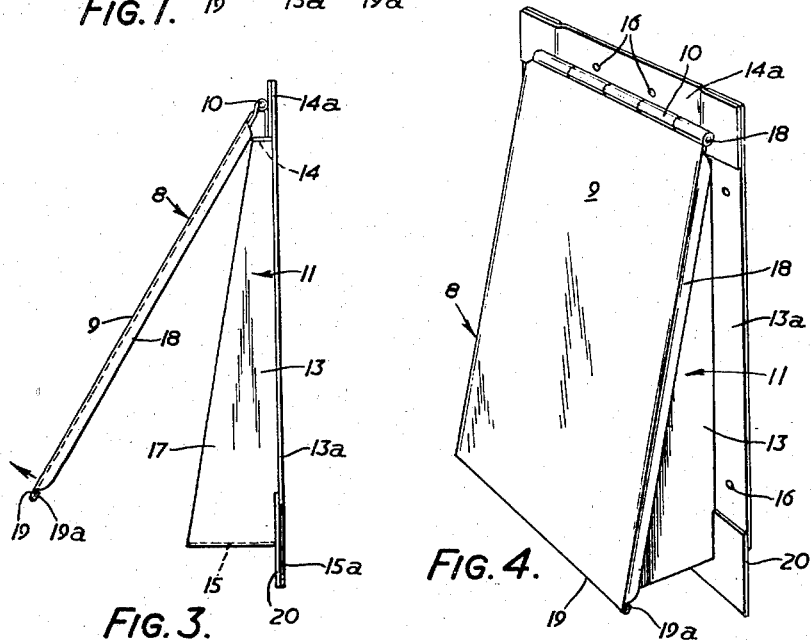

2,886,861

ANIMAL EGRESS AND INGRESS DOORS

George Leonard Bartlett, Hawling, Andoversford, England

Application May 17, 1956, Serial No. 585,422

Claims priority, application Great Britain May 18, 1955

1 Claim. (Cl. 20—16)

This invention relates to animal egress and ingress doors capable of being operated by domestic animals, such as cats or dogs, without human aid.

The invention has for its object to provide a simple construction of animal door which will allow egress and ingress of an animal from and to a building or other structure, for example a dwelling house, shed, kennel or the like, or enable the animal to pass through a door, panel or wall separating one part of the building or structure from another, without disturbing other occupants of the building.

Another object is the provision of an animal door which will afford ingress to the building only to animals accustomed to using the door, i.e. only to animals belonging to the owners.

A further object of the invention is to provide an animal door which, when fitted in an external door, wall or window of a building, will be weatherproof and will not allow draughts to penetrate into the building, the construction of the door allowing it to be easily and quickly fitted to such door, wall or window.

A still further object is to provide an animal egress and ingress door comprising a frame, adapted for fitment to a door, wall or window of a building or other structure to surround an opening formed in the door, wall or window, and a rigid flap member which is pivotally attached to the frame and is loaded by gravity against the frame to close the opening in the latter, the flap member protruding below a lower horizontal edge of the opening in the frame so that egress from the building or other structure can be effected by outward pressure against the flap member whilst ingress to the building can only be had by the animal pulling the flap member towards itself by said protruding portion thereof and thus swinging the flap member outwardly and upwardly about its pivotal attachment to the frame.

This arrangement ensures that an animal that is not accustomed to using the animal door will be unable to effect ingress into the building.

If desired, the flap member may be arranged so that in its closed position it is inclined downwardly and outwardly from the surface to which the frame is secured, whereby rain running down the outer surface of the flap member drains off the bottom thereof instead of running into and through the frame. This may be achieved by constructing the frame so that it is substantially wedge-shaped when viewed in side elevation, the widest ends of the sides of the frame being arranged at the lower end of the latter so that the frame presents edges which are inclined upwardly and inwardly towards the surface against which the animal door is secured, the flap member abutting the inclined edges of the frame when in its closed position.

A preferred form of an animal egress and ingress door constructed in accordance with the invention will now be described, by way of example, with reference to the accompanying drawings, in which:

Figure 1 is a frontal elevation of the animal door,

Figures 2 and 3 are side elevations of the animal door shown in Figure 1, the flap member being shown in the closed and open positions respectively, and Figure 4 is a perspective view of the animal door.

Referring to the drawings, the animal door 8 shown therein comprises a rectangular flap member 9 of plate-like form connected by a hinge 10 at its upper end to a rectangular frame 11 surrounding an opening 12 through which the animal passes when using the animal door. The frame 11 comprises two vertical side members 13, 13 connected at their upper and lower ends by top and bottom end members 14, 15 respectively. To enable the frame 11 to be secured to a door, wall or window of a building (which has previously been prepared to receive the frame by having a rectangular opening of a size similar to the opening 12 in the frame formed therein) the rear edges of the side, top and bottom members of the frame are flanged outwardly, as shown at 13a, 13a; 14a and 15a respectively, such flanges being provided with holes 16 through which screws may be passed to hold the frame in position.

The side members 13, 13 of the frame 11 are of elongated triangular shape, the apex of each side being at its upper end so that the frame is substantially wedge-shaped when viewed in side elevation and presents outer side edges 17, 17 which are inclined upwardly and inwardly towards the surface to which the animal door 8 is secured. It will be appreciated that the position of the axis of the hinge 10 relatively to the inclined edges 17, 17 of the side members 13, 13 is such that the centre of gravity of the flap member 9 is always offset from the vertical plane containing the axis of the hinge so that the flap member closes by gravity against the inclined edges 17, 17, the flap member being inclined outwardly and downwardly when in its closed position from the surface to which the animal door is secured.

To accommodate the triangular side members 13, 13 of the frame 11, the bottom member 15 is considerably wider than the top member 14. Along its horizontal top and vertical side edges the flap member 9, which is slightly larger than the frame 11, is provided with narrow inwardly turned flanges 18 which overlap the corresponding members of the frame 11 when the flap member is in the closed position to render the animal door weatherproof and prevent draughts therethrough. At its lower end the flap member 9 extends downwardly beyond the bottom member 15 of the frame 11 to provide a protruding portion 19 forming means which allow an animal that has been trained to use the animal door to open the latter to gain ingress to the building by placing its nose or paw beneath the protruding portion and pulling the flap member outwardly towards itself in the direction of the arrow in Figure 3. Egress from the building is effected by simply pressing against the flap member from inside the frame 11 so that the flap member swings outwardly about the hinge 10 in the same direction to allow both egress and ingress to the building.

It will be appreciated that only an animal trained to use the animal door, and which has learned to manipulate the latter by pulling the protruding portion 19 towards itself, will be able to obtain ingress to the building. At its lower edge the protruding portion 19 is provided with a rolled edge 19a to facilitate its smooth passage over the back of the animal.

To enable easy manipulation of the animal door 8 the bottom member 15 should be positioned at a small distance above the ground, for example between 3 inches and 15 inches. If it is to be fitted to an existing door of the building it is preferably secured towards the vertical hinged edge of the latter. When the animal door 8 is to be fitted to a window a pane of the latter, or a portion of a pane, may be replaced by a wood panel to which the frame 11 of the animal door is secured. If the window is of the sash type a wood panel to accept the animal door may be positioned below the lower edge of the window which, although left in a raised position, will close on to the wood panel and remain draughtproof.

If desired the two side members 13, 13 of the frame and the bottom member 15 may be formed in one piece, the flanges 13a, 13a, 15a being cut away at the lower corners of the frame to allow the side members to be bent upwardly. The separately formed top member 14 is then secured to the upper ends of the side members 13, 13, as by means of spot welding, and gusset plates 20, 20 are fitted over the flanges at the lower corners of the frame to cover the cut away portions of the flanges. In an alternative arrangement the flanges of the frame may be dispensed with, the sides of the frame being fitted directly to the edges of the aperture to which the animal door is to be fitted.

I claim:

An animal egress and ingress door adapted to be attached to a vertical surface of a building so as to fit an opening therein, said door comprising in combination a rectangular box-like frame, of small depth from front to back, flanged outwardly at its rear end to allow attachment to the vertical surface and comprising two vertical side members fixedly connected to each other by top and bottom end members at their upper and lower ends respectively, said side members being wider at their lower than at their upper ends so that the frame is substantially wedge-shaped when viewed in side elevation and the front of the frame presents side edges which are inclined upwardly and rearwardly, a rigid substantially rectangular flap member slightly larger than the opening in the frame, and hinge means which permanently attach an upper horizontal edge of said flap member to said top member of the frame so that said flap member in its position of rest abuts the inclined side edges of the frame to close the opening therein and is loaded by gravity against said side edges of the frame, the lower end of said flap member protruding below the front horizontal edge of said bottom member so that the animal can effect egress from the building by exerting outward pressure against the flap member due to a walking movement through the opening in the frame whilst ingress to the building can only be had by the animal pulling said flap member towards itself by means of the protruding lower end thereof into a position in which the flap member assumes a position somewhat more inclined to the vertical than, and in the same sense as, than in which it hangs when in its position of rest.

References Cited in the file of this patent

UNITED STATES PATENTS

| | | |
|---|---|---|
| 1,417,212 | Smidley | May 23, 1922 |
| 2,132,507 | Baker | Oct. 11, 1938 |
| 2,758,646 | Johnson | Aug. 14, 1956 |